(12) United States Patent
Sunaga

(10) Patent No.: US 11,446,666 B2
(45) Date of Patent: Sep. 20, 2022

(54) FLUID HANDLING DEVICE

(71) Applicant: Enplas Corporation, Saitama (JP)

(72) Inventor: Nobuya Sunaga, Saitama (JP)

(73) Assignee: Enplas Corporation, Saitama (JP)

( * ) Notice: Subject to any disclaimer, the term of this patent is extended or adjusted under 35 U.S.C. 154(b) by 265 days.

(21) Appl. No.: 16/971,324

(22) PCT Filed: Feb. 18, 2019

(86) PCT No.: PCT/JP2019/005735
§ 371 (c)(1),
(2) Date: Aug. 20, 2020

(87) PCT Pub. No.: WO2019/163688
PCT Pub. Date: Aug. 29, 2019

(65) Prior Publication Data
US 2021/0008558 A1    Jan. 14, 2021

(30) Foreign Application Priority Data

Feb. 21, 2018  (JP) .............................. JP2018-029005
Jun. 4, 2018   (JP) .............................. JP2018-106752

(51) Int. Cl.
*B01L 3/00*           (2006.01)
(52) U.S. Cl.
CPC ..... *B01L 3/502792* (2013.01); *B01L 2400/06* (2013.01)
(58) Field of Classification Search
CPC ......... B01L 3/502792; B01L 3/502784; B01L 2400/06; B01L 2200/0673; B01L 2300/0864; B01L 2300/087; B01L 2300/0887
See application file for complete search history.

(56) References Cited

U.S. PATENT DOCUMENTS

2002/0022261 A1   2/2002  Anderson et al.
2004/0224380 A1  11/2004  Chou et al.
2011/0177586 A1   7/2011  Ismagilov et al.

FOREIGN PATENT DOCUMENTS

WO    WO 2019/163688    8/2019

OTHER PUBLICATIONS

International Search Report and the Written Opinion dated May 7, 2019 From the International Searching Authority Re. Application No. PCT/JP2019/005735 and its Translation of Search Report Into English. (8 Pages).
Shields Iv et al. "Microflttidic Cell Sorting: A Review of the Advances in the Separation of Cells from Debulking to Rare Cell Isolation", Lab on a Chip, 15(5):1230-1249, Jan. 6, 2015.

*Primary Examiner* — Christopher Adam Hixson

(57) ABSTRACT

The objective of the present invention is to provide a fluid handling device capable of easily isolating droplets. This objective is achieved by means of a fluid handling device which includes a first flow passage through the interior of which, when a fluid containing a droplet is delivered, the droplet can move, a first chamber which captures the droplet moving through the first flow passage, a second chamber into which the droplet captured by the first chamber can move, and a second flow passage providing communication between the first chamber and the second chamber, wherein the second flow passage is capable of selectively allowing the droplet to pass, or restricting passage of the droplet.

10 Claims, 8 Drawing Sheets

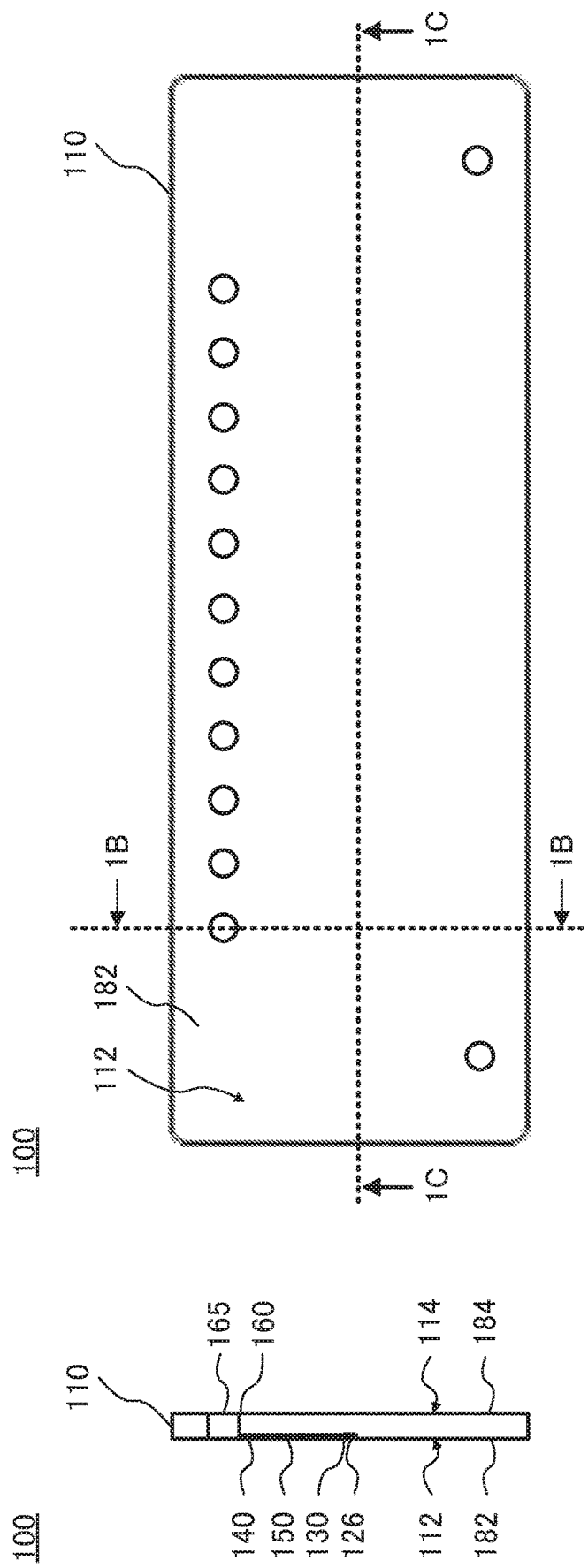
FIG. 1A
FIG. 1C
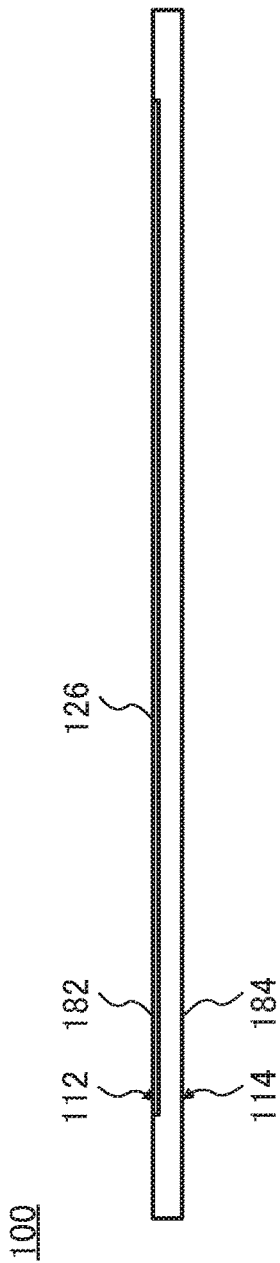
FIG. 1B

FLUID HANDLING DEVICE

TECHNICAL FIELD

The present invention relates to a fluid handling device.

BACKGROUND ART

Fluid handling devices for highly accurate analysis of small amounts of analytes such as cells, proteins, nucleic acids, etc., in clinical, food, environmental or other tests are known. For example, a fluid handling device is known that handles a tiny liquid drop (hereinafter referred to also as "droplet") of from 0.1 to 1000 µm in diameter produced from a fluid containing the above-mentioned analytes (see, e.g., Non-Patent Literature (hereinafter referred to as "NPL") 1). In the above-mentioned fluid handling device, a droplet including a predetermined analyte (hereinafter also referred to as "selection target substance") is selected from all produced droplets.

There is a demand to separate droplets handled by the fluid handling device as disclosed in NPL 1, and individually analyze an analyte contained in each of the droplets.

For example, as a method of separating substances in fluid, Patent Literature (hereinafter, referred to as "PTL") 1 describes that a particle of a substance is made float at a portion of a node of a standing wave generated by a plurality of transducers, so that movement and stoppage of the particle of the substance can be controlled by fixing and moving the node. According to PTL 1, the separation method in which the movement of the particle of the substance is controlled in the above-mentioned manner is applicable to cell separation by Fluorescence activated cell sorting (FACS) or the like.

In addition, PTL 2 describes that, by forming a recess in a surface disposed counter to the flow direction of fluid, a particle of a substance in the fluid can be temporarily stably retained in the recess, and the retained particle of the substance can also be released after treatment or observation.

In addition, PTL 3 describes that a liquid mass that is deformable in accordance with the width of a channel and is formed to close the channel can be captured in an enlarged part of the channel which is formed in a spherical shape or the like.

CITATION LIST

Patent Literature

PTL 1
US Patent Application Publication No. 2002/0022261
PTL 2
US Patent Application Publication No. 2004/0224380
PTL 3
US Patent Application Publication No. 2011/0177586

Non-Patent Literature

NPL 1
C. Wyatt Shields I V, et al., Microfluidic cell sorting: a review of the advances in the separation of cells from debulking to rare cell isolation, Lab on a Chip, Vol. 15, pp. 1230-1249

SUMMARY OF INVENTION

Technical Problem

However, in the methods described in PTL 1 to PTL 3, it is difficult to dispense substances into individual wells or it is necessary to provide an extensive equipment to dispense them.

The present invention is made in view of the foregoing point. An object of the present invention is to provide a fluid handling device that can easily separate a droplet.

Solution to Problem

The fluid handling device of the present invention includes: a first channel through which, when a fluid containing a droplet is caused to flow, the droplet is movable; a first chamber formed by widening of the first channel, the first chamber being configured to capture the droplet moving through the first channel in a state where the first chamber is disposed to widen vertically above the first channel; a second chamber to which the droplet captured in the first chamber is movable; and a second channel that communicates between the first chamber and the second chamber. Passage and restriction of passage of the droplet through the second channel are able to be selectively performed.

In addition, the fluid handling system of the present invention includes: the fluid handling device; and a holding mechanism capable of holding the fluid handling device such that the first chamber widens vertically above the first channel.

Advantageous Effects of Invention

The present invention provides a fluid handling device that can easily separate a droplet.

BRIEF DESCRIPTION OF DRAWINGS

FIG. 1A is a schematic plan view illustrating a configuration of a fluid handling device according to Embodiment 1;

FIG. 1B is a cross-sectional view of the fluid handling device taken along line 1B-1B illustrated in FIG. 1A;

FIG. 1C is a sectional view of the fluid handling device taken along line 1C-1C illustrated in FIG. 1A;

DESCRIPTION OF EMBODIMENT

Embodiment 1

(Configuration of Fluid Handling Device)

Figure 2A:
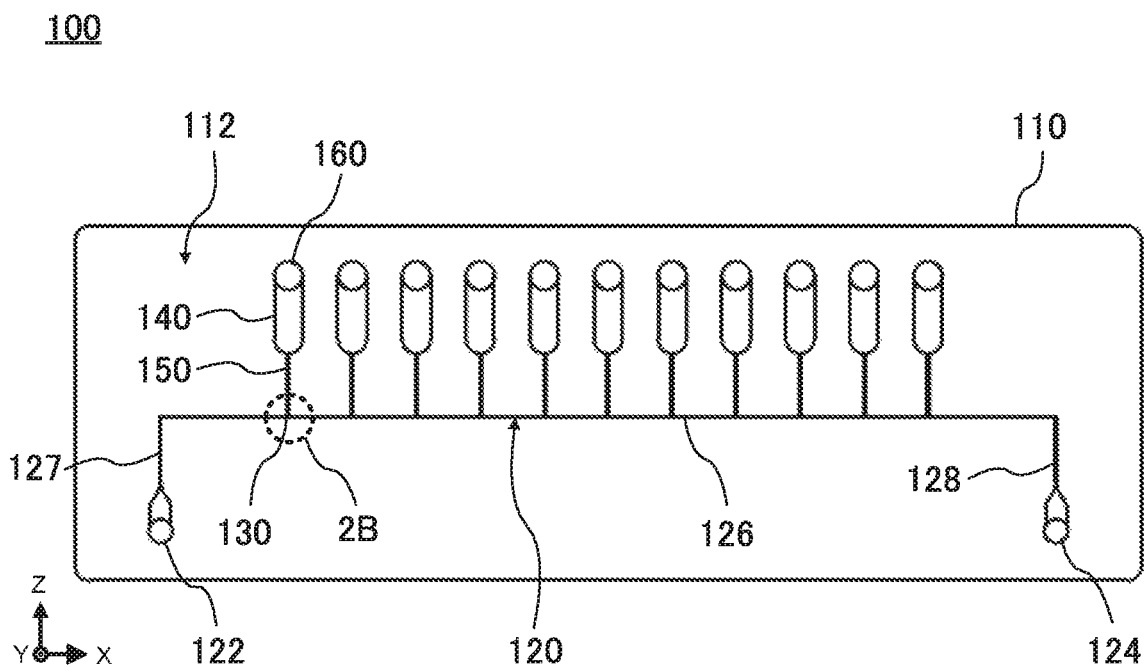
FIG. 2A is a schematic plan view illustrating a configuration of a main-body part that the fluid handling device includes.

FIG. 1A is a schematic plan view illustrating a configuration of fluid handling device 100 according to the present embodiment. FIG. 1B is a cross-sectional view of fluid handling device 100 taken along line 1B-1B illustrated in FIG. 1A. FIG. 1C is a sectional view of fluid handling device 100 taken along line 1C-1C illustrated in FIG. 1A. Fluid handling device 100 includes thin plate-shaped main-body part (substrate) 110, and first cover part 182 and second cover part 184 joined to a pair of surfaces 112 and 114 of main-body part 110, respectively. Note that, hatching is omitted in FIGS. 1B and 1C.

Figures 2B, 2C:
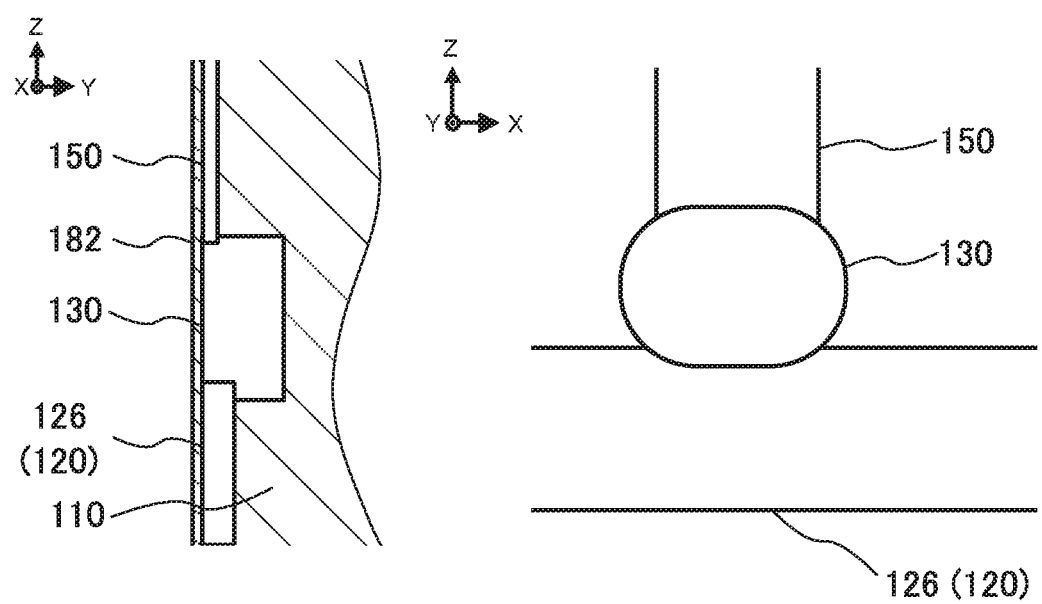
FIG. 2B is an enlarged sectional view of area 2B circled in FIG. 2A taken along the YZ plane.
FIG. 2C is an enlarged sectional view of area 2B circled in FIG. 2A taken along the XZ plane.
Figure 3A:
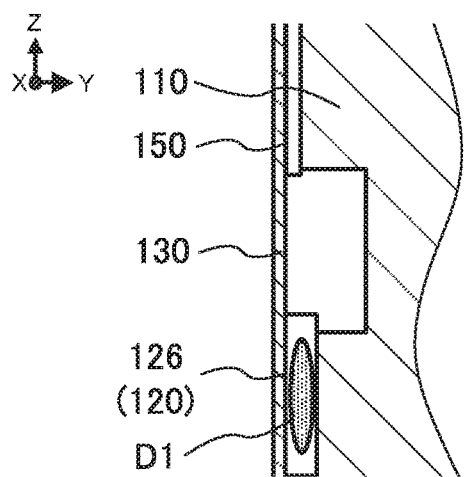
FIGS. 3A and 3B are schematic sectional views illustrating a state in which a droplet moves through a main channel when the fluid handling device according to Embodiment 1 is operated.
Figure 3B:
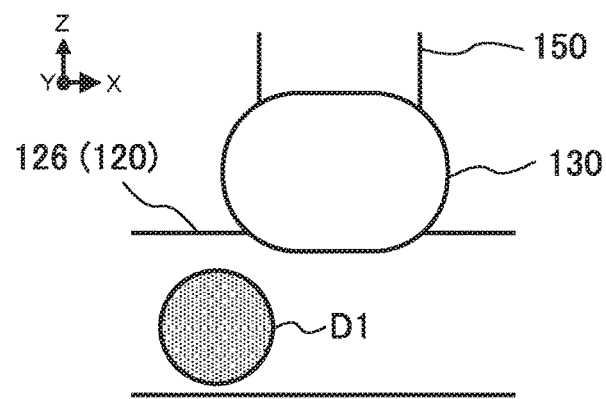
Figure 3C:
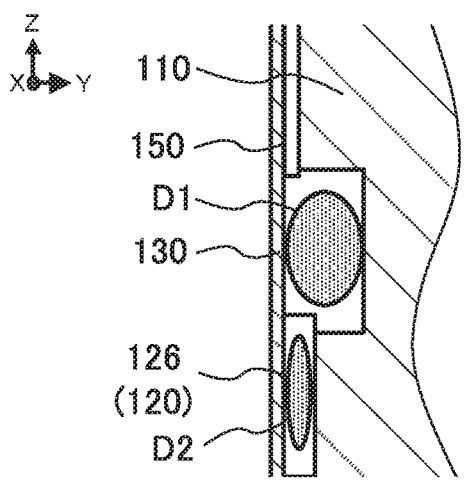
FIGS. 3C and 3D are schematic sectional views illustrating a state in which a droplet is captured in a first chamber.
Figure 3D:
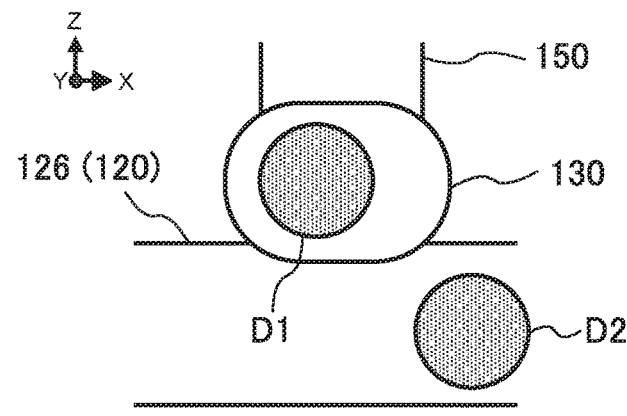
Figure 3E:
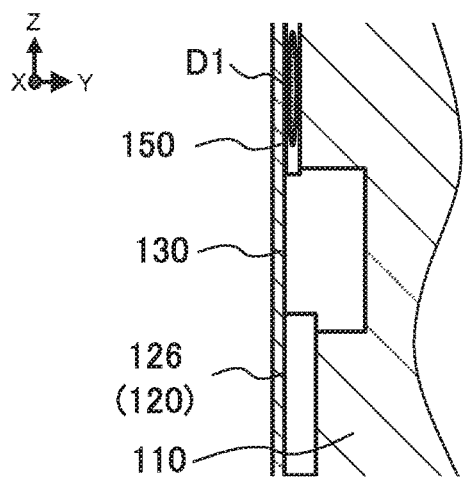
FIGS. 3E and 3F are schematic cross-sectional views illustrating a state in which a droplet is introduced into a second channel.
Figure 3F:
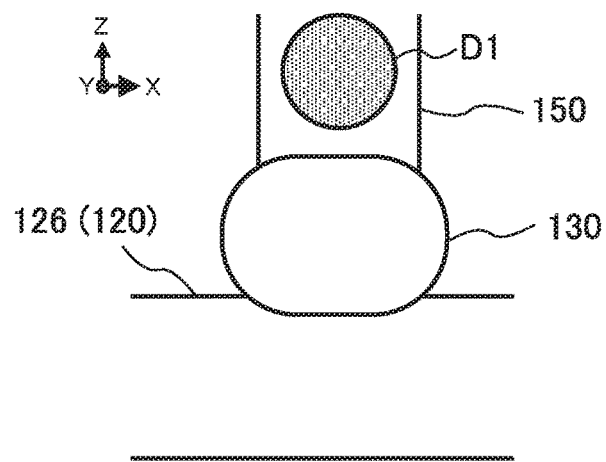

FIG. 2A is a schematic plan view illustrating a configuration of main-body part 110. FIG. 2B is an enlarged sectional view illustrating the vicinity of surface 112 in area 2B circled in FIG. 2A taken along the YZ plane. FIG. 2C is an enlarged sectional view of area 2B circled in FIG. 2A taken along the XZ plane. Note that, for ease of explanation, FIG. 2B illustrates a state in which surface 112 of main-body part 110 is covered with first cover part 182, and channels are thus formed. The same applies to FIGS. 3A to 3F described below.

Fluid handling device 100 includes first channel 120 that communicates between inlet 122 and outlet 124, a plurality of first chambers 130 that are spaces formed by widening of first channel 120, a plurality of second chambers 140 disposed in pairs with the plurality of first chambers 130, respectively, and second channels 150 that communicate between first chambers 130 and second chambers 140. All of these channels and chambers are formed by covering with first cover part 182 recesses formed in surface 112 of main-body part 110. Fluid handling device 100 further includes collection parts 160 that are spaces formed between, on the one hand, second chambers 140 formed by covering with first cover part 182 the recesses formed in surface 112 of main-body part 110 and, on the other hand, openings 165 opened in surface 112 of main-body part 110.

Fluid handling device 100 is capable of causing a dispersion liquid of liquid drops (droplets) produced from a fluid containing a selection target substance (e.g., cells, DNAs, and proteins such as enzymes, or the like) to flow through first channel 120 by using an external force such as a pump or the like. The dispersion liquid is a dispersion liquid in which droplets that are liquid drops of a solvent such as water or the like containing a selection target substance are dispersed in a parent phase fluid such as an oil having a low solubility with respect to the droplets. The above-mentioned droplets may be liquid drops of a substantially spherical shape with a diameter of from 0.1 μm through 1000 μm, and preferably from 5 μm through 200 μm, for example. The droplets can be produced by known methods. Note that the droplets may be liquid drops not containing the selection target substance.

The droplets are formed from a solvent that is lighter in specific gravity than the parent phase fluid. Thus, when a fluid containing the droplets is caused to flow through first channel 120 at a first flow rate in a state where fluid handling device 100 is disposed such that first chambers 130 widen vertically above first channel 120 (such that the first chambers widen in a direction opposite to the gravitational direction from connection positions at which the first chambers are connected to the first channel), the droplets move from first channel 120 to first chambers 130, and are captured in first chambers 130. Since each of first chambers 130 is sized to capture only one or a few droplets, the droplets are distributedly captured in the plurality of first chambers 130. Thereafter, when a fluid containing no droplet is caused to flow through first channel 120 at a second flow rate higher than the first flow rate, the distributedly captured droplets move from first chambers 130 to second channels 150, move from second channels 150 to second chambers 140, and move further to collection parts 160. First cover part 182 or second cover part 184 is then punctured to collect the droplets from collection parts 160. Fluid handling device 100 can thus easily separate the droplets.

Recesses are formed in surface 112 of main-body part 110. The recesses serve as first channel 120, first chambers 130, second chambers 140, and second channels 150 after first cover part 182 is joined to surface 112. The recess serving as first channel 120 is a groove-shaped recess having a constant depth. Partial regions of this recess at the opposite ends are widely formed and the remaining region is narrowly formed. The recesses serving as first chambers 130 are a plurality of small sections that are formed by branches extending in the same direction from the narrowly formed region of the recess serving as first channel 120, and that have a depth greater than that of the recess serving as first channel 120 (depth in the direction from surface 112 to surface 114). The recesses serving as second chambers 140 are a plurality of small sections that are disposed at a constant distance with respect to the recess serving as first channel 120 to extend in the same direction as the recesses serving as first chambers 130, and that have a depth the same as that of first channel 120. The recesses serving as second channels 150 are linear groove-shaped recesses that communicate between the recesses serving as first chambers 130 and the recesses serving as second chambers 140, and that are more shallowly formed than the recess serving as first channel 120.

Main-body part 110 includes a plurality of substantially semicylindrical spaces formed to extend through main-body part 110 toward surface 114 respectively from portions of farthest regions of the recesses serving as second chambers 140 from the recesses serving as second channels 150. After first cover part 182 and second cover part 184 are joined to main-body part 110, the plurality of substantially semicylindrical spaces serve as collection parts 160 that collect droplets from second chambers 140.

Main-body part 110 is formed of a resin material, examples of which include: polyester such as polyethylene terephthalate; polycarbonate; acrylic resin such as polymethylmethacrylate; polyvinyl chloride; polyolefin such as polyethylene, polypropylene and cycloolefin resin; polyether; polystyrene; silicone resin; and various elastomers.

First cover part 182 is joined to surface 112 of main-body part 110 to cover the groove-shaped recesses and the plurality of substantially semicylindrical spaces formed in main-body part 110, so as to form first channel 120, first chambers 130, second chambers 140, and second channels 150, and form one surface of collection parts 160.

Second cover part 184 is joined to surface 114 of main-body part 110 to cover the plurality of substantially semicylindrical spaces formed in main-body part 110, to form the other surface of collection parts 160.

First cover part 182 and second cover part 184 are formed of a material that is easy to puncture with a pipette or the like, such as acrylic resin, cyclic olefin homopolymer resin (COP), cyclic olefin copolymerization resin (COC), olefin elastomer such as propylene elastomer, polyethylene and silicone rubber, for example.

While first cover part 182 and second cover part 184 may be thermally bonded to surface 112 and surface 114 of main-body part 110, respectively, it is preferable, from the viewpoint of suppressing deformation or the like of main-body part 110, first cover part 182 and second cover part 184 due to heat during the bonding, that the first and the second cover parts be bonded to surface 112 and surface 114 of main-body part 110 using an adhesive such as an epoxy system.

First channel 120 is a channel through which a fluid containing droplets flows. Inlet 122 and outlet 124 communicating with the outside of the main-body part are arranged at the opposite ends of first channel 120, and thus the fluid containing droplets, a fluid used for separation of droplets, and the like can flow from inlet 122 to outlet 124. First channel 120 includes main channel 126 along which a plurality of first chambers 130 are formed, introduction channel 127 that communicates between main channel 126 and inlet 122, and discharge channel 128 that communicates between main channel 126 and outlet 124.

The sizes of main channel 126, introduction channel 127, and discharge channel 128 are not particularly limited as long as these channels do not cause the droplets to be broken. For example, the cross-sectional area of main channel 126 in a section orthogonal to the flow direction of fluid through the main channel is less than the sectional area of a droplet. In this case, the droplet is deformed by being pressed by the side surface forming main channel 126 and by first cover part 182. Further, when the below-described sectional area of each of first chambers 130 in a section orthogonal to the flow direction of fluid through main channel 126 is greater than the cross-sectional area of main channel 126 in a section orthogonal to the flow direction of main channel 126, the deformed droplet is more likely to be captured in first chambers 130 that are larger spaces than main channel 126. Note that, in the present specification, the "sectional area of the droplet" means a sectional area in a section passing through the center of such a droplet as that which is not deformed by an external force and is converted into a corresponding sphere.

For example, the cross-sectional area of main channel 126 orthogonal to the flow direction of fluid through the main channel may be 16.5% or greater and 100% or less of the sectional area of the droplet to be separated. For example, in the case where the sectional area of the droplet is 7850 $\mu m^2$ (the droplet has a particle size of 100 $\mu m$), the cross-sectional area of main channel 126 is 1300 $\mu m^2$ or greater and 7850 $\mu m^2$ or less. In the case where the particle size of the droplet is 100 $\mu m$, the minimum value of the width and depth of main channel 126 in the section orthogonal to the flow direction of fluid through the main channel is preferably 13 $\mu m$ or greater, more preferably 20 $\mu m$ or greater, and still more preferably 70 $\mu m$ or greater from the viewpoint of preventing breakage of the droplet. In other words, the minimum value of the width and depth of main channel 126 in the section orthogonal to the flow direction of fluid through the main channel is preferably $13/100$ or greater, more preferably $1/5$ or greater, and still more preferably $7/10$ or greater of the particle size of the droplet.

Each of introduction channel 127 and discharge channel 128 is a channel with a channel diameter that is sufficiently greater than the diameter of the droplet to be separated, and that allows free movement of the droplet, for example. The channel diameter and length of main channel 126 are not particularly limited. For example, when the diameter of the droplet to be separated is 100 $\mu m$, main channel 126 may be a channel whose depth from surface 112 toward surface 114 is 10 $\mu m$ or greater and 200 $\mu m$ or less, whose width (the width in the Z-axis direction in FIG. 2C) parallel to the flow direction of fluid through second channels 150, which will be described later, is 30 $\mu m$ or greater and 200 $\mu m$ or less, and whose length (the length in the X-axis direction in FIG. 2A) is 1 cm or greater and 20 cm or less. It is preferable that introduction channel 127 and discharge channel 128 have a depth from surface 112 and a width in the direction parallel to surface 112 substantially the same as the channel diameter of the main channel.

Each of main channel 126, introduction channel 127, and discharge channel 128 may also have a substantially rectangular sectional shape or a substantially semicircular sectional shape.

In the present embodiment, the flow direction of first channel 120 changes substantially at a right angle in a border region between main channel 126 and introduction channel 127, and in a border region between main channel 126 and discharge channel 128. It is preferable, from the viewpoint of preventing breakage or the like of the droplet deformed under pressure, that the extending direction of the channel be continuously and gradually changed in such regions where the flow direction is changed.

Each of first chambers 130 is a space formed by widening of main channel 126 of first channel 120. First chambers 130 communicate respectively with second channels 150 at positions which are, with the aforementioned spaces being interposed in between, opposed to connection portions at which the first chambers are connected to first channel 120. Note that, the cross-sectional area of each of second channels 150 in a section orthogonal to the flow direction of fluid through the second channel is smaller than the sectional area of the droplet. Thus, in a state where fluid handling device 100 is disposed such that the first chambers widen vertically above first channel 120, first chambers 130 cause droplets flowing through first channel 120 to be moved by buoyancy and capture the droplets in the aforementioned spaces. Each of first chambers 130 has a size capable of accommodating (capturing) a small number of droplets (one to five droplets). From the viewpoint of increasing the ease of separation of droplets, it is preferable that first chamber 130 have a size capable of accommodating (capturing) only one droplet. When first chamber 130 has a size capable of accommodating one droplet, the maximum value of the sectional area of first chamber 130 is preferably 100% or greater and smaller than 160%, and more preferably 100% or greater and 150% or less of the sectional area of the droplet, for example. Note that the sectional area of first chamber 130 means the sectional area of the first chamber in a section orthogonal to the flow direction of fluid through main channel 126. For example, first chamber 130 may be a space having a depth from surface 112 toward surface 114 of from 30 μm through 500 μm, an opening diameter (width in the X-axis direction in FIG. 2C) of an opening to main channel 126 of from 100 μm through 160 μm, and a length (distance between the opening plane of the opening to first channel 120 and the opening plane of an opening to second channel 150, that is, a length in the Z-axis direction in FIG. 2C) of from 100 μm through 140 μm.

First chamber 130 may be a space having any shape such as a semicylinder, a partial sphere, a rectangular parallelepiped, a cube, or the like. From the viewpoint of preventing breakage or the like of a droplet deformed under pressure, it is preferable that an edge portion of the opening of first chamber 130 to first channel 120 (main channel 126) be beveled. Note that, in the present specification, beveling includes both rounding (the surface after rounding is a curved surface) and chamfering (the surface after chamfering is a flat surface).

Second chambers 140 are substantially semicylindrical spaces that are disposed in pairs with first chambers 130, respectively, and that have a diameter greater than those of first channel 120 and first chambers 130. For example, each of second chambers 140 may have a depth from surface 112 toward surface 114 of from 30 μm through 500 μm, a width (width in the X-axis direction in FIG. 2A) in a direction parallel to the flow direction of main channel 126 of from 300 μm through 5 mm, and a length (length in the Z-axis direction in FIG. 2A) in a direction parallel to a widening direction of first chambers 130 widening from main channel 126 of from 500 μm through 5 mm.

Second chamber 140 extends (widens) from a joint portion at which the second chamber is joined to second channel 150 to a joint portion at which the second chamber is joined to collection part 160 at an angle different from the flow direction of fluid through main channel 126 of first channel 120. From the viewpoint of facilitating the operation of fluid handling device 100 and the movement of droplets, it is preferable that second chamber 140 extend in such a direction that the angle with respect to the flow direction of fluid through main channel 126 is 45 degrees or greater and 135 degrees or less, and it is more preferable that the second chamber extend in such a direction that the angle is 90 degrees. In addition, from the viewpoint of facilitating the operation of fluid handling device 100, it is preferable that second chamber 140 extend in the same direction as the flow direction of fluid through introduction channel 127.

Note that second chamber 140 may be a space having any shape such as a semicylinder, a square column, a polygonal column, or the like. From the viewpoint of increasing the ease of movement of droplets toward collection part 160, it is preferable that the sectional shape of second chamber 140 from a link region where the second chamber is linked to second channel 150 to collection part 160 be constant or be gradually expanded. In addition, from the viewpoint of preventing breakage of a droplet deformed under pressure, it is preferable that the edge portion of the opening of second chamber 140 to second channel 150 be beveled.

Each of collection parts 160 is a substantially cylindrical space formed toward surface 114 from the edge portion of second chamber 140. It is preferable that collection part 160 have a size that allows collecting a droplet which has moved to the inside of collection part 160 with a pipette or the like after first cover part 182 or second cover part 184 is punctured to open toward the outside. For example, collection part 160 may be a space having a diameter of from 500 μm through 35 mm in the Z direction in the figures.

Note that collection part 160 has a semicylindrical shape in the present embodiment, but may be a space having any shape such as a square column, a polygonal column, or the like. From the viewpoint of facilitating collection of droplets, it is preferable that when a droplet is to be collected by inserting a pipette from the side of surface 112, collection part 160 be shaped such that the sectional shape from surface 114 to surface 112 is constant or gradually expanded. Alternatively, it is preferable that when the droplet is to be collected by inserting a pipette from the side of surface 114, collection part 160 be shaped such that the sectional shape from surface 112 to surface 114 is constant or gradually expanded. In addition, from the viewpoint of preventing breakage or the like of a droplet deformed under pressure, it is preferable that the edge portion of the opening of collection part 160 to second chamber 140 be beveled.

Each of second channels 150 is a channel that communicates between paired first and second chambers 130 and 140, and is a channel for allowing a droplet to move from first chamber 130 to second chamber 140 without via first channel 120. The cross-sectional area of second channel 150 in a section orthogonal to the flow direction of fluid through the second channel is smaller than the cross-sectional area of main channel 126 in a section orthogonal to the flow direction of fluid through the main channel. In addition, it is preferable that the cross-sectional area of second channel 150 in a section orthogonal to the flow direction of fluid through the second channel be smaller than the sectional area of the droplet to restrict free movement of the droplet. However, second channel 150 has an enough cross-sectional area in a section orthogonal to the flow direction of fluid through the second channel, through which a slightly deformed droplet can flow by increasing the flow rate of the fluid flowing through first channel 120. The percentage of the cross-sectional area of second channel 150 in a section orthogonal to the flow direction of fluid through the second channel may be 30% or greater and 95% or less of the cross-sectional area of main channel 126 in a section orthogonal to the flow direction of fluid through the main channel. For example, the percentage of the cross-sectional area of second channel 150 may be 17% or greater and 95% or less of the sectional area of the droplet to be separated. Specifically, second channel 150 may be a channel having a minimum channel diameter (length or width) of from 17 μm through 95 μm.

(First Operation Method of Fluid Handling Device)

Fluid handling device 100 is used, with first cover part 182 and second cover part 184 being joined respectively to surface 112 and surface 114 of main-body part 110.

To begin with, fluid handling device 100 is installed at such an angle that first chambers 130, second chambers 140, and second channels 150 are vertically above first channel 120, and a fluid containing a plurality of droplets is introduced from inlet 122 to first channel 120 at a first flow rate. The introduced fluid component flows through first channel 120 in the order of introduction channel 127, main channel 126, and discharge channel 128, and is discharged from outlet 124. At this time, when droplet D1 (see FIGS. 3A and 3B) moving through main channel 126 reaches a portion where first chamber 130 is formed, droplet D1 moves to first chamber 130 by the buoyancy. Although second channel 150 is opened to first chamber 130, the movement of droplet D1 from first chamber 130 to second channel 150 is restricted and droplet D1 stays in first chamber 130 since second channel 150 is more narrowly formed. Droplet D1 is thus captured in first chamber 130 (see FIGS. 3C and 3D). It should be noted that, since each of first chambers 130 can accommodate (capture) only one or a small number of droplets, succeeding droplets D2 sequentially move through main channel 126 in the direction of discharge channel 128, and are captured in next first chamber 130 where no droplet is captured. A plurality of droplets are thus captured sequentially in first chambers 130 from first chamber 130 on the side of introduction channel 127 to first chamber 130 on the side of discharge channel 128.

The flow rate of the introduced fluid during introduction of the fluid containing the droplets into first channel 120 may be any flow rate as long as each of the droplets is unlikely to be deformed to move from first chamber 130 to second channel 150. For example, the flow rate of the fluid introduced at this time may be 20 µm/s or greater and 500 µm/s or less.

Next, a fluid containing no droplet is introduced from inlet 122 into first channel 120 at a second flow rate that is greater than the first flow rate. The introduced fluid component exerts pressure on the droplets captured in first chambers 130 to slightly deform the droplets to introduce the droplets into second channels 150 (see FIGS. 3E and 3F) and to move the droplets through second channels 150 toward second chambers 140. The droplets are thus moved to second chambers 140. Since second chambers 140 are respectively disposed in pairs with first chambers 130 via second channels 150, the droplet captured in certain first chamber 130 moves only to corresponding second chamber 140 at this time. The droplets individually captured in first chambers 130 can thus individually move to second chambers 140 without being mixed again.

Note that, the aforementioned fluid containing no droplet may be introduced into first channel 120 from outlet 124 at this time. Also in this case, the introduced fluid containing no droplet exerts pressure on a plurality of droplets contained in a fluid introduced from inlet 122 into first channel 120 and captured in first chambers 130. The droplets are slightly deformed, introduced into second channels 150, and moved through second channels 150 into second chambers 140. The above-described fluid containing no droplet introduced from outlet 124 may be the fluid (parent phase fluid) which contained a plurality of droplets, which was introduced into first channel 120 from inlet 122, whose droplets were captured in first chambers 130, and which was discharged from outlet 124. Reusing the aforementioned parent phase fluid as described above makes it possible to reduce the amount of fluid used, so as to allow individually collecting the droplets at a lower cost. Note that, when a droplet which was not captured in first chambers 130 is contained in the aforementioned fluid discharged from outlet 124, the discharged fluid is put in a container having a predetermined depth, thereby making it possible to separate the droplet floating by buoyancy and the parent phase fluid from each other.

The flow rate of the fluid introduced for moving the droplets from first chambers 130 to second chambers 140 may be any flow rate as long as the droplets can be slightly deformed and moved from first chambers 130 to second chambers 140 through second channels 150. For example, the flow rate of the fluid introduced at this time may be 60 µm/s or greater and 2000 µm/s or less.

Lastly, fluid handling device 100 is installed such that second cover part 184 is the upper surface, second cover part 184 is punctured, and the droplets moved to respective collection parts 160 are taken out with a pipette or the like. Alternatively, fluid handling device 100 is installed such that first cover part 182 is the upper surface, first cover part 182 is punctured, and the droplets moved to respective collection parts 160 are taken out with a pipette or the like. Since each of collection parts 160 accommodates only one or a small number of droplets, the droplets can be easily individually collected.

(Second Operation Method of Fluid Handling Device)

The first operation method described above may be modified such that, when droplets are moved from first chambers 130 to second chambers 140, first cover part 182 or second cover part 184 is punctured at one or more collection parts 160, and the fluid containing no droplet is introduced into first channel 120 from inlet 122 while pressure in the direction of first chambers 130 and main channel 126 is generated in second chamber 140 and second channel 150 corresponding to collection part 160 at which the cover part is punctured. As a result of puncturing first cover part 182 or second cover part 184, pressure in the direction of first chambers 130 and main channel 126 is exerted on the fluid by gravity in second chamber 140 and second channel 150 corresponding to collection part 160 at which first cover part 182 or second cover part 184 is punctured. The fluid introduced into first channel 120 (main channel 126) from inlet 122 is restricted by the exertion of pressure from moving in the direction of outlet 124, while the movement of the fluid in the direction of second channels 150 and second chambers 140 is promoted. During the exertion of pressure as a result of puncturing first cover part 182 or second cover part 184 at one or more collection parts 160, it is thus possible to increase the flow rate of the fluid flowing through second channel 150 corresponding to collection part 160 at which neither the first cover part nor the second cover part is punctured.

Thus, according to the present operation method, even when the flow rate of the fluid introduced into first channel 120 (main channel 126) is lower than that in the first operation method within the range of from 60 µm/s through 2000 µm/s, which is the same range as in the first operation method, it is possible to introduce droplets captured in first chambers 130 into second channels 150 and move the droplets to second chambers 140.

Lastly, fluid handling device 100 is installed at such an angle that openings 165 of collection parts 160 are vertically above second chambers 140, second cover part 184 is punctured, and the droplets moved to respective collection parts 160 are taken out with a pipette or the like. Alternatively, fluid handling device 100 is installed at such an angle that openings 165 of collection parts 160 are vertically below second chambers 140, first cover part 182 is punctured, and the droplets moved to respective collection parts 160 are taken out with a pipette or the like. Since each of collection parts 160 accommodates only one or a small number of droplets, the droplets can be easily individually collected.

As described above, according to the present operation method, the droplets can be moved to second chambers 140 even when the flow rate of the fluid introduced into first channel 120 is reduced. Accordingly, during introduction of droplets captured in first chambers 130 into second channels 150, it is possible to prevent release of the captured droplets from first chambers 130 that could be caused by introducing a fluid into first channel 120 at a high flow rate, so as to further enhance droplet collection efficiency.

Note that, in this case, first cover part 182 or second cover part 184 may be punctured at one collection part 160 or a plurality of collection parts 160, and the number of collection parts at which the first cover part or the second cover part is punctured may be appropriately determined depending on the flow rate required for moving droplets to second chambers 140. Note also that, while collection part 160 at which first cover part 182 or second cover part 184 is punctured may be collection part 160 disposed at any position in this case, collection part 160 corresponding to second chamber 140 which is formed at a position closest to outlet 124 is preferable.

(Effect)

With fluid handling device 100 according to the present embodiment, droplets can be easily separated.

Embodiment 2

(Configuration of Fluid Handling Device)

Figure 4A:
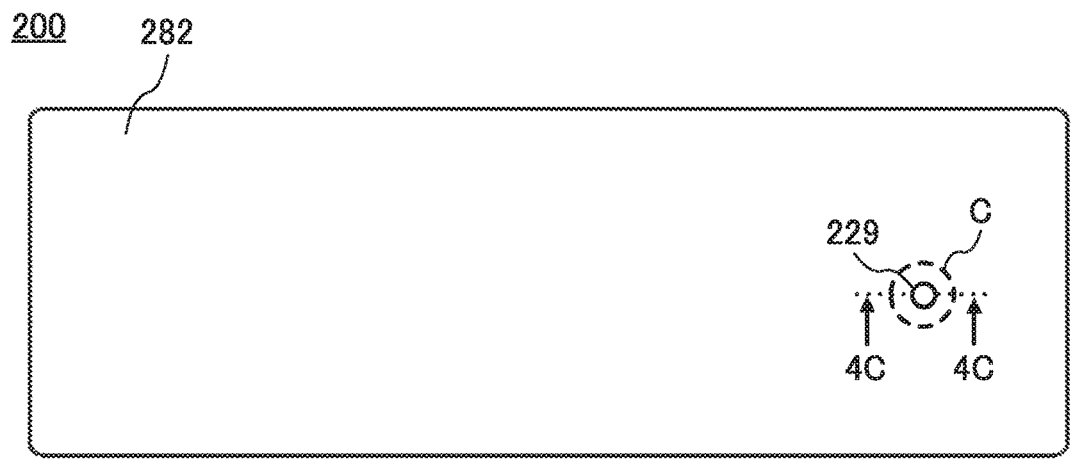
FIG. 4A is a schematic plan view illustrating a configuration of a fluid handling device according to Embodiment 2.
Figure 4B:
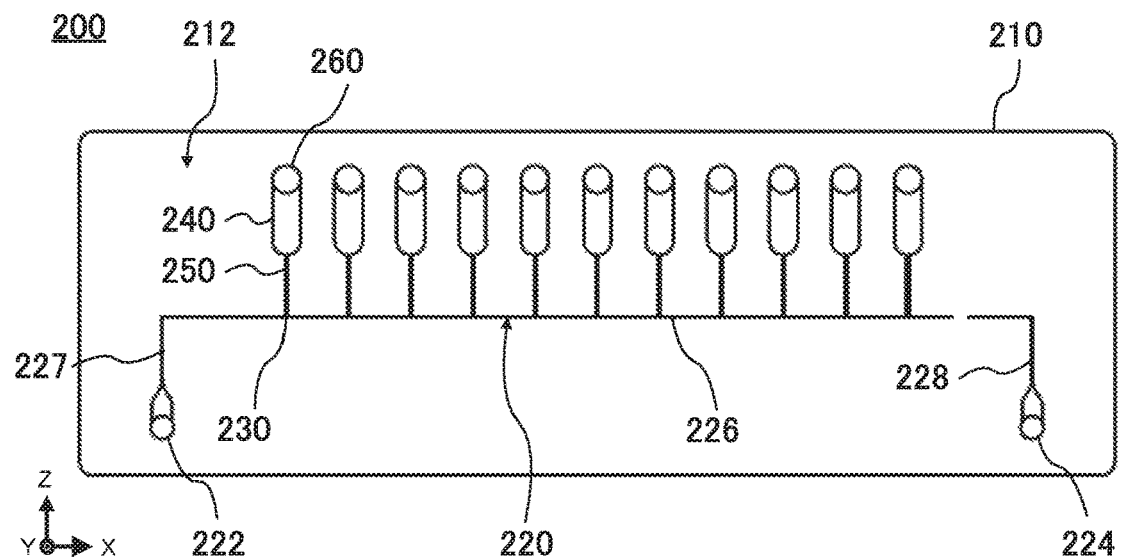
FIG. 4B is a schematic plan view illustrating a configuration of a main-body part that the fluid handling device includes.
Figure 4C:
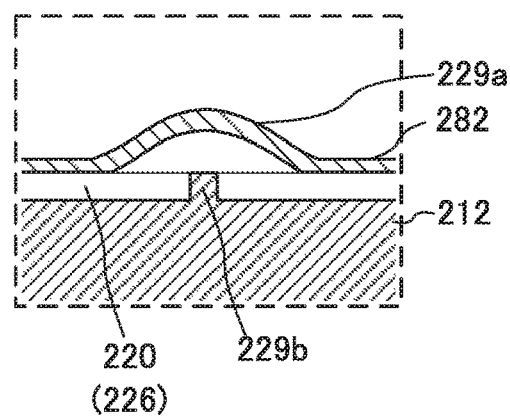
FIG. 4C is an enlarged sectional view of area C in FIG. 4A taken along line 4C-4C.

FIG. 4A is a schematic plan view illustrating a configuration of a fluid handling device according to Embodiment 2. FIG. 4B is a schematic plan view illustrating a configuration of a main-body part that the fluid handling device includes. FIG. 4C is an enlarged sectional view of area C in FIG. 4A taken along line 4C-4C.

Fluid handling device 200 includes main-body part 210, and first cover part 282 and a second cover part (not illustrated) joined to a pair of surfaces of main-body part 210, respectively.

Fluid handling device 200 includes first channel 220 that communicates between inlet 222 and outlet 224, a plurality of first chambers 230 that are spaces formed by widening of first channel 220, a plurality of second chambers 240 disposed in pairs with the plurality of first chambers 230, respectively, and second channels 250 that communicate between first chambers 230 and second chambers 240. All of these channels and chambers are formed by covering with first cover part 282 recesses formed in surface 212 of main-body part 210. Fluid handling device 200 further includes collection parts 260 formed by covering main-body part 210 with first cover part 282 and the second cover part on opposite sides of through holes formed in the main-body part.

Fluid handling device 200 according to the present embodiment differs from fluid handling device 100 according to Embodiment 1 only in the configuration of first channel 220. Accordingly, descriptions of the common components will be omitted.

Also in the present embodiment, first channel 220 is a channel through which a fluid containing droplets flows, and inlet 222 and outlet 224 communicating with the outside of the main-body part are arranged at the opposite ends of the first channel, and thus the fluid containing droplets, fluid used for separation of droplets, and the like can flow from inlet 222 to outlet 224. However, in the present embodiment, first channel 220 includes first valve 229 that is capable of switching between an open state in which a fluid flows from the upstream side to the downstream side of the first channel and a closed state in which the flow of fluid from the upstream side to the downstream side of the first channel is blocked up, and that controls the amount of fluid flowing between first chambers 230 and outlet 224 by switching between the open state and the closed state.

In the present embodiment, first valve 229 is a membrane valve formed by a part of first cover part 282 joined to surface 212 of main-body part 210. As illustrated in FIG. 4C, first valve 229, which is a membrane valve, includes diaphragm 229a and partition wall 229b. In the open state of the valve, a gap through which a fluid moves from the upstream side to the downstream side (from the side of inlet 222 to the side of outlet 224) of first channel 220 (main channel 226) is formed between diaphragm 229a and partition wall 229b. On the other hand, in the closed state of the valve, diaphragm 229a is pressed by a pusher or the like so as to come into contact with partition wall 229b. Accordingly, no gap is formed between diaphragm 229a and partition wall 229b, and the flow of the fluid from the upstream side to the downstream side (from the side of inlet 222 to the side of outlet 224) of first channel 220 (main channel 226) is blocked up.

Note that, as in a modification described below, the fluid sometimes flows through first channel 220 in both directions of from the side of inlet 222 to the side of outlet 224 and from the side of outlet 224 to the side of inlet 222. Also in this case, "upstream" means the side of inlet 222 of first channel 220 and "downstream" means the side of outlet 224 of first channel 220 in the specification.

First valve 229 is disposed at a position on the downstream side of the connection positions at which first channel 220 and first chambers 230 are connected to each other. Specifically, first valve 229 is disposed between outlet 224 and one of a plurality of first chambers 230 which is disposed at a position closest to outlet 224. When first valve 229 is closed, movement of fluid from first chambers 230 toward outlet 224 is restricted, while movement of fluid from first chambers 230 toward second channels 250 and second chambers 240 is promoted. First valve 229 thus increases the flow rate (flow pressure) of the fluid flowing to second channels 250.

(Operation Method of Fluid Handling Device)

Fluid handling device 200 is used, with first cover part 282 and the second cover part being joined respectively to the pair of surfaces of main-body part 210.

To begin with, fluid handling device 200 is installed at such an angle that second channels 250 and second chambers 240 are vertically above first channel 220, and a fluid containing a plurality of droplets is introduced from inlet 222 to first channel 220. Note that, first valve 229 is opened at this time. Thus, the droplets move through main channel 226 of first channel 220 toward discharge channel 228, and are sequentially captured in first chambers 230 from first chamber 230 on the side of introduction channel 227 to first chamber 230 on the side of discharge channel 228 as in Embodiment 1.

Next, a fluid containing no droplet is introduced from inlet 222 into first channel 220. The introduced fluid component exerts pressure on the droplets captured in first chambers 230 and moves the droplets to second chambers 240 through second channels 250. The droplets captured in respective first chambers 230 thus move to corresponding second chambers 240. The droplets individually captured in first chambers 230 can thus individually move to second chambers 240 without being mixed again. Note that, the fluid handling device may or may not be rotated at this time.

At this time, movement of the introduced fluid containing no droplet from first channel 220 toward first chambers 230, second channels 250, and second chambers 240 is promoted by closing first valve 229 to restrict the movement of the fluid from first chambers 230 to outlet 224. Thus, release of the droplets from first chambers 230 to first channel 220 (main channel 226) that could be caused by the flow of fluid from second channels 250 to first chambers 230 is prevented, so that it is possible to further enhance droplet collection efficiency.

Lastly, fluid handling device 200 is disposed at such an angle that first cover part 282 or the second cover part is vertically above collection parts 260, the cover part which is arranged vertically above the collection parts is punctured at collection parts 260 to take out the droplets moved to respective collection parts 260 with a pipette or the like. Since each of collection parts 260 accommodates only one or a small number of droplets, the droplets can be easily individually collected.

(Effect)

With fluid handling device 200 according to the present embodiment, droplets can be easily separated.

In addition, with fluid handling device 200 according to the present embodiment, droplet collection efficiency can further be enhanced.

(Modification of Embodiment 2)

Figure 5A:
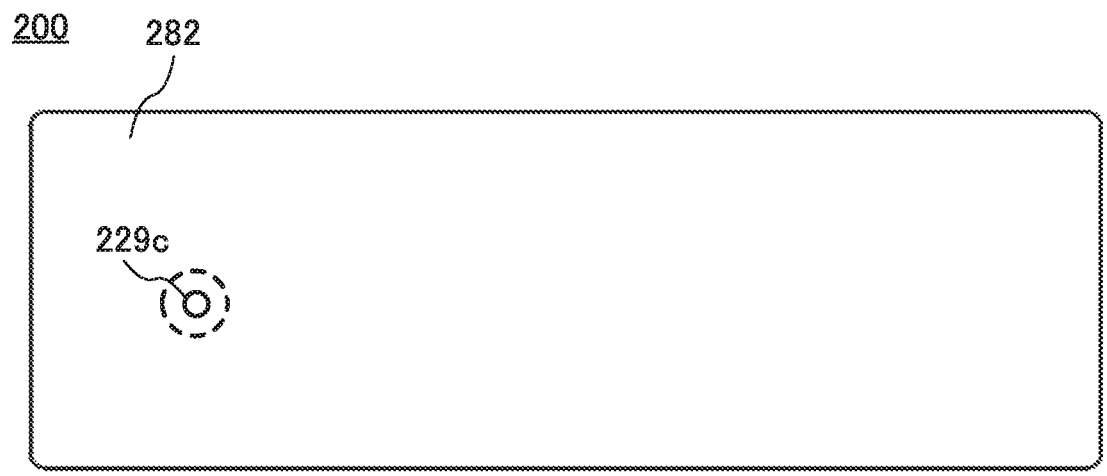
FIG. 5A is a schematic plan view illustrating a configuration of a fluid handling device according to a modification of Embodiment 2.
Figure 5B:
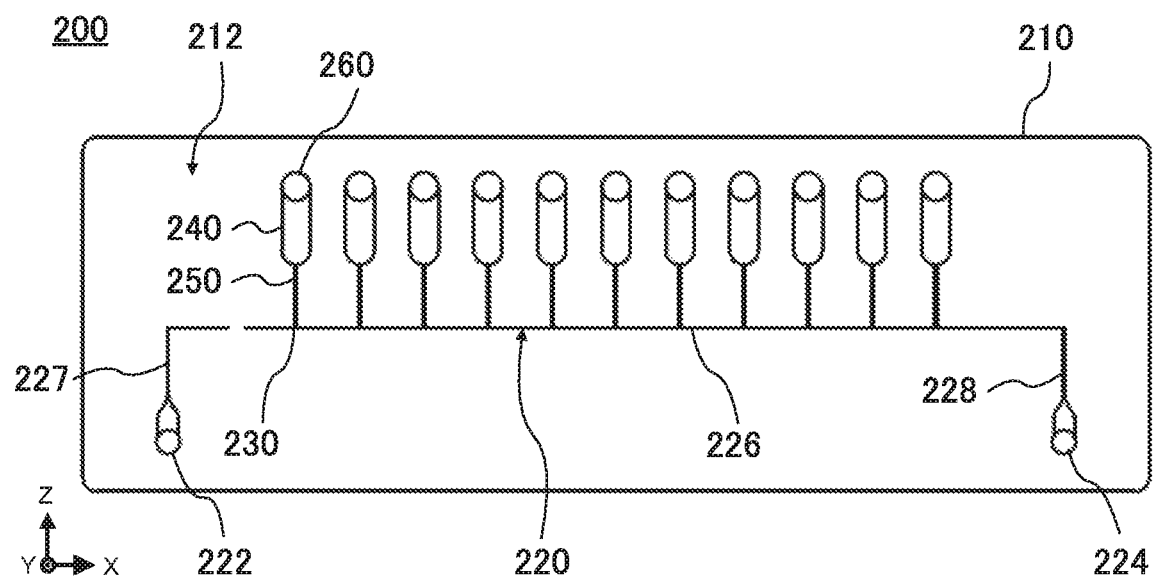
FIG. 5B is a schematic plan view illustrating a configuration of a main-body part that the fluid handling device includes.

FIG. 5A is a schematic plan view illustrating a configuration of fluid handling device 200 according to a modification of the present embodiment. FIG. 5B is a schematic plan view illustrating a configuration of main-body part 210 that fluid handling device 200 includes. As illustrated in FIGS. 5A and 5B, second valve 229c may be disposed between inlet 222 and one of a plurality of first chambers 230 which is disposed at a position closest to inlet 222 in Embodiment 2 instead of placing the first valve between outlet 224 and one of the plurality of first chambers 230 which is disposed at a position closest to outlet 224. Second valve 229c is disposed at a position on the upstream side of the connection positions at which first channel 220 and first chambers 230 are connected to each other. Specifically, second valve 229c is disposed between inlet 222 and one of the plurality of first chambers 230 which is disposed at a position closest to inlet 222.

In this case, a fluid containing no droplet is introduced into first channel 220 from outlet 224 after droplets are captured in first chambers 230 in the operation of fluid handling device 200 described above. When second valve 229c is closed during introduction of the aforementioned fluid containing no droplet into first channel 220 from outlet 224, movement of fluid from first chambers 230 toward inlet 222 is restricted, while movement of fluid from first chambers 230 toward second channels 250 and second chambers 240 is promoted. Second valve 229c thus increases the flow rate (flow pressure) of the fluid flowing to second channels 250. The above-described fluid containing no droplet introduced from outlet 224 may be the fluid (parent phase fluid) which contained a plurality of droplets, which was introduced into first channel 220 from inlet 222, whose droplets were captured in first chambers 230, and which was discharged from outlet 224. Reusing the aforementioned parent phase fluid as described above makes it possible to reduce the amount of fluid used, so as to allow individually collecting the droplets at a lower cost. Note that, when a droplet which was not captured in first chambers 230 is contained in the aforementioned fluid discharged from outlet 224, the discharged fluid is put in a container having a predetermined depth, thereby making it possible to separate the droplet floating by buoyancy and the parent phase fluid from each other.

Embodiment 3

(Configuration of Fluid Handling Device)

Figure 6A:
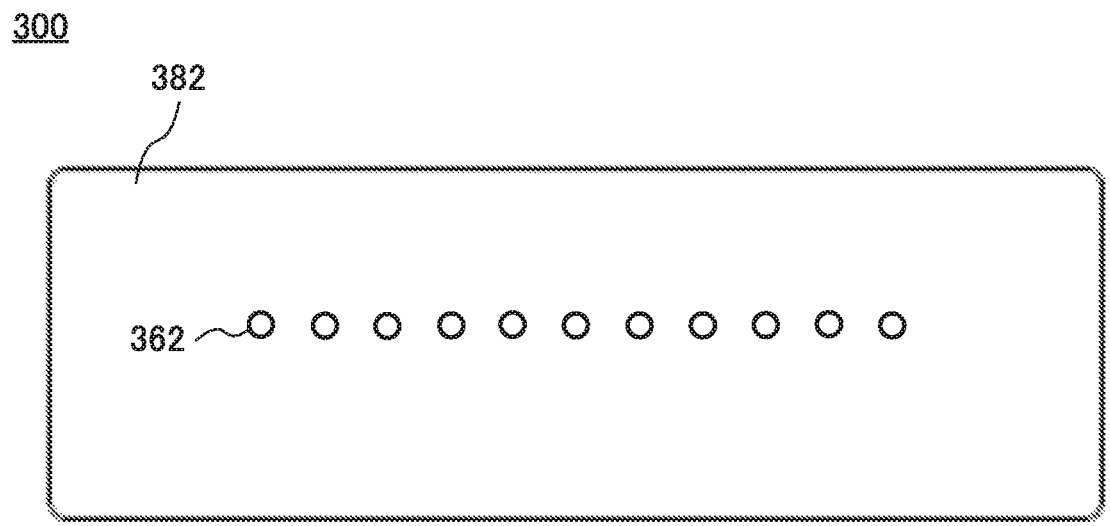
FIG. 6A is a schematic plan view illustrating a configuration of a fluid handling device according to Embodiment 3.
Figure 6B:
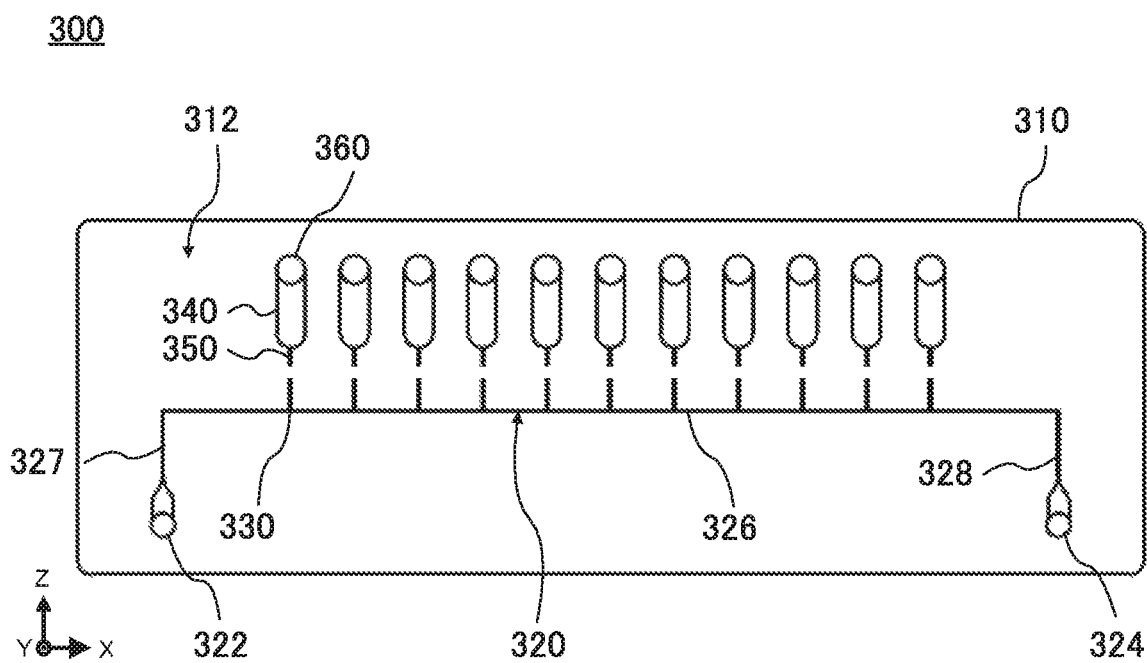
FIG. 6B is a schematic plan view illustrating a configuration of a main-body part that the fluid handling device includes.

FIG. 6A is a schematic plan view illustrating a configuration of fluid handling device 300 according to the present embodiment. FIG. 6B is a schematic plan view illustrating a configuration of main-body part 310 that fluid handling device 300 includes.

Fluid handling device 300 includes main-body part 310, and first cover part 382 and a second cover part (not illustrated) joined to a pair of surfaces of main-body part 310, respectively.

Fluid handling device 300 includes first channel 320 that communicates between inlet 322 and outlet 324, a plurality of first chambers 330 that are spaces formed by widening of first channel 320, a plurality of second chambers 340 disposed in pairs with the plurality of first chambers 330, respectively, and second channels 350 that communicate between first chambers 330 and second chambers 340. All of these channels and chambers are formed by covering with first cover part 382 recesses formed in surface 312 of main-body part 310. Fluid handling device 300 further includes collection parts 360 formed by covering main-body part 310 with first cover part 382 and the second cover part on opposite sides of through holes formed in the main-body part.

Fluid handling device 300 according to the present embodiment differs from fluid handling device 100 according to Embodiment 1 only in the configuration of second channels 350. Accordingly, descriptions of the common components will be omitted.

Also in the present embodiment, each of second channels 350 is a channel that communicates between paired first and second chambers 330 and 340. However, in the present embodiment, each of second channels 350 includes third valve 362 that is capable of switching between an open state in which a fluid flows from the upstream side to the downstream side of second channels 350 and a closed state in which the flow of fluid from the upstream side to the downstream side of second channels 350 is blocked up, and that controls the amount of fluid flowing between first chambers 330 and second chambers 340 by switching between the open state and the closed state. In the present embodiment, each of third valves 362 is a membrane valve formed by a part of first cover part 382 joined to surface 312 of main-body part 310. Third valve 362 has the same configuration as first valve 229 in Embodiment 2, and, in the open state of the valve, forms a gap through which a fluid moves from the upstream side to the downstream side of second channels 350 (from the side of first chambers 330 to the side of second chambers 340), while in the closed state of the valve, blocks up the flow of fluid from the upstream side to the downstream side of second channels 350 (from the side of first chambers 330 to the side of second chambers 340).

Third valves 362 as seen in plan view of fluid handling device 300 (main-body part 310) are disposed between first chambers 330 and second chambers 340 in such a manner as to be arranged in a row in a direction parallel to the flow direction of first channel 320. When third valves 362 are closed, movement of fluid and droplets through second channels 350 from first chambers 330 to second chambers 340 is restricted, whereas when third valves 362 are opened, movement of fluid and droplets through second channels 350 from first chambers 330 to second chambers 340 is facilitated. Note that, third valves 362 are disposed to be arranged in a row in the present embodiment, and thus a plurality of third valves 362 can be easily operated simultaneously or continuously.

(Operation Method of Fluid Handling Device)

Fluid handling device 300 is used, with first cover part 382 and the second cover part being joined respectively to the pair of surfaces of main-body part 310.

To begin with, fluid handling device 300 is installed at such an angle that second channels 350 and second chambers 340 are vertically above first channel 320, and a fluid containing a plurality of droplets is introduced from inlet 322 to first channel 320. Note that, at this time, third valves 362 are closed. Thus, the droplets move through main channel 326 of first channel 320 toward discharge channel 328, and are sequentially captured in first chambers 330 from first chamber 330 on the side of introduction channel 327 to first chamber 330 on the side of discharge channel 328 as in Embodiment 1.

Then, fluid handling device 300 is rotated to be installed at such an angle that first channel 320, first chambers 330, and second channels 350 are located in the same horizontal plane. In this state, third valves 362 are opened while a fluid containing no droplet is introduced from inlet 322 to first channel 320. The introduced fluid component exerts pressure on the droplets captured in first chambers 330 and moves the droplets to second chambers 340 through second channels 350. The droplets captured in respective first chambers 330 thus move to corresponding second chambers 340. The droplets individually captured in first chambers 330 can thus individually move to second chambers 340 without being mixed again.

Note that, the aforementioned fluid containing no droplet may be introduced into first channel 320 from outlet 324 at this time. Also in this case, the introduced fluid component exerts pressure on the droplets captured in first chambers 330 to slightly deform the droplets to introduce the droplets into second channels 350 and moves the droplets through second channels 350 toward second chambers 340. The above-described fluid containing no droplet introduced from outlet 324 may be the fluid (parent phase fluid) which contained a plurality of droplets, which was introduced into first channel 320 from inlet 322, whose droplets were captured in first chambers 330, and which was discharged from outlet 324. Reusing the aforementioned parent phase fluid as described above makes it possible to reduce the amount of fluid used, so as to allow individually collecting the droplets at a lower cost. Note that, when a droplet which was not captured in first chambers 330 is contained in the aforementioned fluid discharged from outlet 324, the discharged fluid is put in a container having a predetermined depth, thereby making it possible to separate the droplet floating by buoyancy and the parent phase fluid from each other.

At this time, since fluid handling device 300 is installed at such an angle that first channel 320, first chambers 330, and second channels 350 are located in the same horizontal plane, it is possible to prevent release of droplets from first chambers 330 to first channel 320 (main channel 326) that could be caused by the flow of fluid from second channels 350 to first chambers 330 generated when third valves 362 are opened.

Lastly, fluid handling device 300 is disposed at such an angle that first cover part 382 or the second cover part is vertically above collection parts 360, the cover part which is arranged vertically above the collection parts is punctured at collection parts 360 to take out the droplets moved to respective collection parts 360 with a pipette or the like. Since each of collection parts 360 accommodates only one or a small number of droplets, the droplets can be easily individually collected.

(Effect)

With fluid handling device 300 according to the present embodiment, droplets can be easily separated.

Embodiment 4

(Configuration of Fluid Handling Device)

Figure 7A:
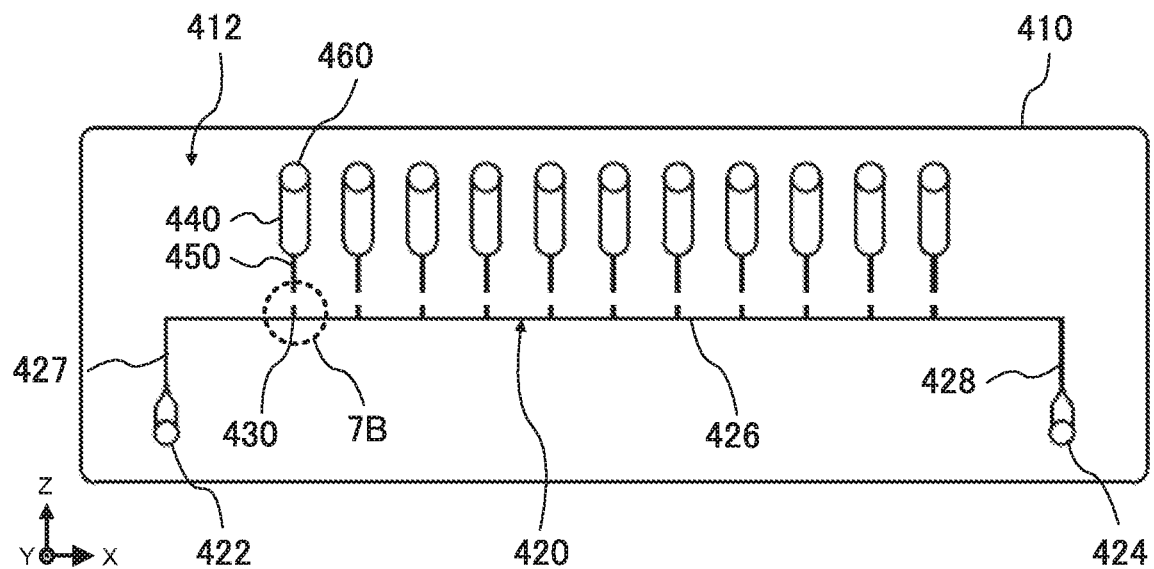
FIG. 7A is a schematic plan view illustrating a configuration of a main-body part that a fluid handling device according to Embodiment 4 includes.
Figure 7B:
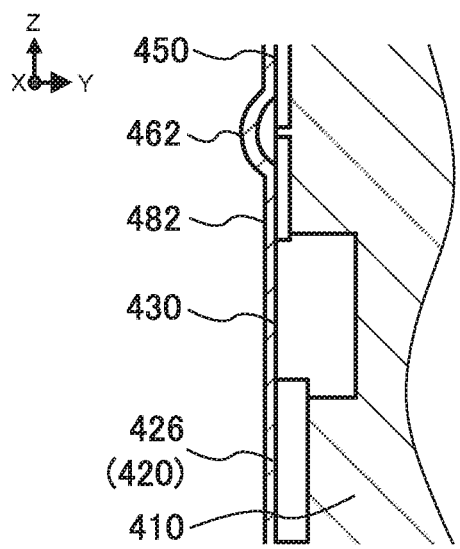
FIG. 7B is an enlarged sectional view of area 7B circled in FIG. 7A taken along the YZ plane.
Figure 7C:
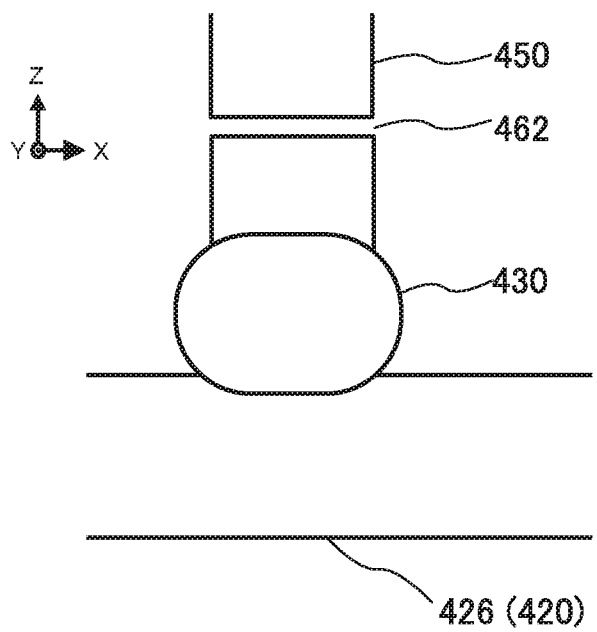
FIG. 7C is an enlarged sectional view of area 7B circled in FIG. 7A taken along the XZ plane.

FIG. 7A is a schematic plan view illustrating a configuration of main-body part 410 that fluid handling device 400 according to the present embodiment includes. FIG. 7B is an enlarged sectional view illustrating the vicinity of surface 412 in area 7B circled in FIG. 7A taken along the YZ plane. FIG. 7C is an enlarged sectional view of area 7B circled in FIG. 7A taken along the XZ plane. Note that, for ease of explanation, FIGS. 7B and 7C illustrate a state in which surface 412 of main-body part 410 is covered with first cover part 482, and channels are thus formed. Note also that, the configuration of fluid handling device 400 as seen in plan view is substantially the same as fluid handling device 300 (see FIG. 6A) according to Embodiment 3 except that the positions of the valves are different between the embodiments, and the description thereof is thus omitted.

Fluid handling device 400 includes main-body part 410, and first cover part 482 and a second cover part (not illustrated) joined to a pair of surfaces of main-body part 410, respectively.

Fluid handling device 400 includes first channel 420 that communicates between inlet 422 and outlet 424, a plurality of first chambers 430 that are spaces formed by widening of first channel 420, a plurality of second chambers 440 disposed in pairs with the plurality of first chambers 430, respectively, and second channels 450 that communicate between first chambers 430 and second chambers 440. All of these channels and chambers are formed by covering with first cover part 482 recesses formed in surface 412 of main-body part 410. Fluid handling device 400 further includes collection parts 460 formed by covering main-body part 410 with first cover part 482 and the second cover part on opposite sides of through holes formed in the main-body part.

Fluid handling device 400 according to the present embodiment differs from fluid handling device 100 according to Embodiment 1 only in the configuration of second channels 450. Accordingly, descriptions of the common components will be omitted.

Also in the present embodiment, each of second channels 450 is a channel that communicates between paired first and second chambers 430 and 440.

Note that, each of second channels 450 is a channel with a channel diameter that is sufficiently larger than the diameter of a droplet to be separated, and allows free movement of the droplet. Although the channel diameter and depth of second channel 450 in the present embodiment is not particularly limited, it is preferable that first chambers 430 and second channels 450 have the same width in the flow direction of main channel 426 of first channel 420 and it is also preferable that they have the same depth from the viewpoint of facilitation of movement of droplets by eliminating a step between first chambers 430 and second chambers 440.

In addition, in the present embodiment, second channels 450 include third valves 462 that are capable of switching between an open state in which a fluid flows from the upstream side to the downstream side of second channels 450 and a closed state in which the flow of fluid from the upstream side to the downstream side of second channels 450 is blocked up, and that controls the amount of fluid flowing between first chambers 430 and second chambers 440. In the present embodiment, each of third valves 462 is a membrane valve formed by a part of first cover part 482 joined to surface 412 of main-body part 410. Third valve 462 has the same configuration as first valve 229 in Embodiment 2, and, in the open state of the valve, forms a gap through which a fluid moves from the upstream side to the downstream side of second channels 450 (from the side of first chambers 430 to the side of second chambers 440), while in the closed state of the valve, blocks up the flow of fluid from the upstream side to the downstream side of second channels 450 (from the side of first chambers 430 to the side of second chambers 440).

Third valves 462 are disposed at connection portions of second channels 450 at which the second channels are connected to first chambers 430, so as to be arranged in a row in a direction parallel to the flow direction of first channel 420. When third valves 462 are closed, movement of fluid and droplets through second channels 450 from first chambers 430 to second chambers 440 is restricted, whereas when third valves 462 are opened, movement of fluid and droplets through second channels 450 from first chambers 430 to second chambers 440 is facilitated. Note that, third valves 462 are disposed to be arranged in a row in the present embodiment, and thus a plurality of third valves 462 can be easily operated simultaneously or continuously.

(Operation Method of Fluid Handling Device)

Fluid handling device 400 is used, with first cover part 482 and the second cover part being joined respectively to the pair of surfaces of main-body part 410.

To begin with, fluid handling device 400 is installed at such an angle that second channels 450 and second chambers 440 are vertically above first channel 420, and a fluid containing a plurality of droplets is introduced from inlet 422 to first channel 420. Note that, at this time, third valves 462 are closed. Thus, the droplets move through main channel 426 of first channel 420 toward discharge channel 428, and are sequentially captured in first chambers 430 from first chamber 430 on the side of introduction channel 427 to first chamber 430 on the side of discharge channel 428 as in Embodiment 1.

Then, fluid handling device 400 is rotated to be installed at such an angle that first channel 420, first chambers 430, and second channels 450 are located in the same horizontal plane. In this state, third valves 462 are opened while a fluid containing no droplet is introduced from inlet 422 to first channel 420. The introduced fluid component exerts pressure on the droplets captured in first chambers 430 and moves the droplets to second chambers 440 through second channels 450. The droplets captured in respective first chambers 430 thus move to corresponding second chambers 440. The droplets individually captured in first chambers 430 can thus individually move to second chambers 440 without being mixed again.

Note that, the aforementioned fluid containing no droplet may be introduced into first channel 420 from outlet 424 at this time. Also in this case, the introduced fluid component exerts pressure on the droplets captured in first chambers 430 to slightly deform the droplets to introduce the droplets into second channels 450 and moves the droplets through second channels 450 toward second chambers 440. The above-described fluid containing no droplet introduced from outlet 424 may be the fluid (parent phase fluid) which contained a plurality of droplets, which was introduced into first channel 420 from inlet 422, whose droplets were captured in first chambers 430, and which was discharged from outlet 424. Reusing the aforementioned parent phase fluid as described above makes it possible to reduce the amount of fluid used, so as to allow individually collecting the droplets at a lower cost. Note that, when a droplet which was not captured in first chambers 430 is contained in the aforementioned fluid discharged from outlet 424, the discharged fluid is put in a container having a predetermined depth, thereby making it possible to separate the droplet floating by buoyancy and the parent phase fluid from each other.

At this time, since fluid handling device 400 is installed at such an angle that first channel 420, first chambers 430, and second channels 450 are located in the same horizontal plane, it is possible to prevent release of droplets from first chambers 430 to first channel 420 (main channel 426) that could be caused by the flow of fluid from second channels 450 to first chambers 430 generated when third valves 462 are opened.

Lastly, fluid handling device 400 is disposed at such an angle that first cover part 482 or the second cover part is vertically above collection parts 460, the cover part which is arranged vertically above the collection parts is punctured at collection parts 460 to take out the droplets moved to respective collection parts 460 with a pipette or the like. Since each of collection parts 460 accommodates only one or a small number of droplets, the droplets can be easily individually collected.

(Effect)

With fluid handling device 400 according to the present embodiment, droplets can be easily separated.

Embodiment 5

(Configuration of Fluid Handling Device)

Figure 8A:
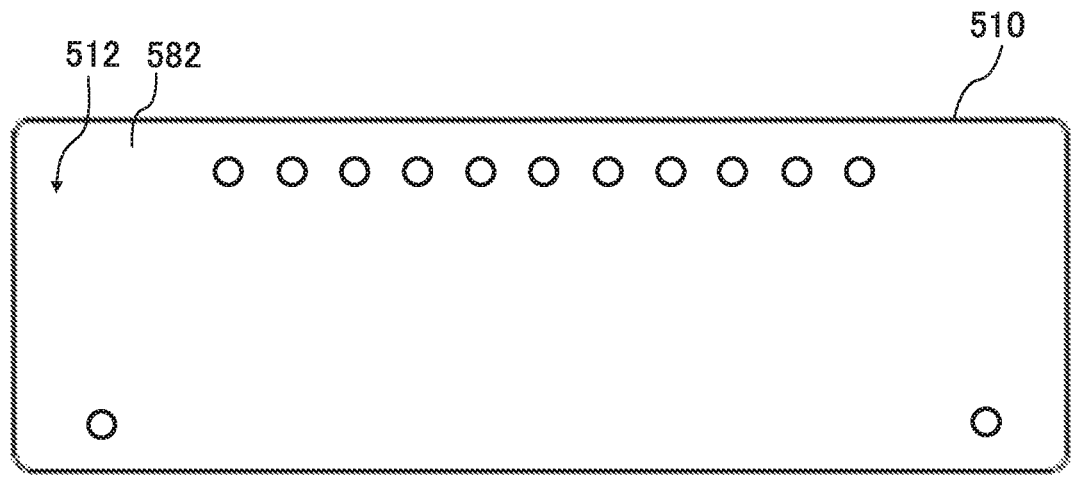
FIG. 8A is a schematic plan view illustrating a configuration of a fluid handling device according to Embodiment 5.
Figure 8B:
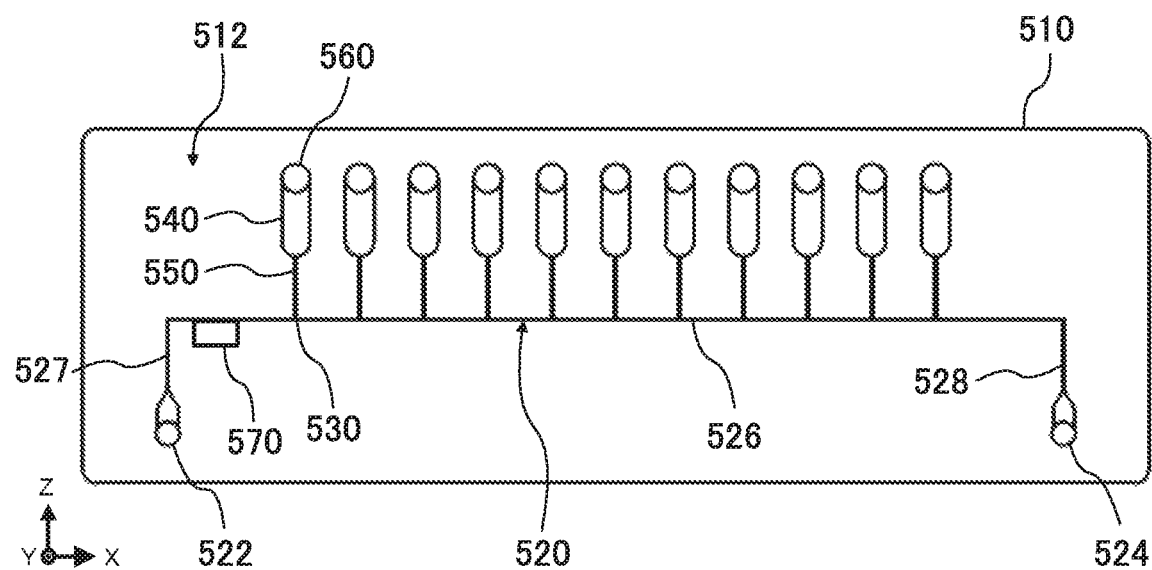
FIG. 8B is a schematic plan view illustrating a configuration of a main-body part that the fluid handling device includes.

FIG. 8A is a schematic plan view illustrating a configuration of fluid handling device 500 according to the present embodiment. FIG. 8B is a schematic plan view illustrating a configuration of main-body part 510 that fluid handling device 500 includes.

Fluid handling device 500 includes main-body part 510, and first cover part 582 and a second cover part (not illustrated) joined to a pair of surfaces of main-body part 510, respectively.

Fluid handling device 500 includes first channel 520 that communicates between inlet 522 and outlet 524, storage chamber 570 and a plurality of first chambers 530 that are spaces formed by widening of first channel 520, a plurality of second chambers 540 disposed in pairs with the plurality of first chambers 530, respectively, and second channels 550 that communicate between first chambers 530 and second chambers 540. All of these channels and chambers are formed by covering with first cover part 582 recesses formed in surface 512 of main-body part 510. Fluid handling device 500 further includes collection parts 560 formed by covering main-body part 510 with first cover part 582 and the second cover part on opposite sides of through holes formed in the main-body part.

Fluid handling apparatus 500 according to the present embodiment differs from fluid handling device 100 according to Embodiment 1 only in that fluid handling apparatus 500 includes storage chamber 570 that is a space formed by covering with first cover part 582 a recess formed in surface 512 of main-body part 510, and by widening of first channel 520 in a different direction than first chambers 530. Accordingly, descriptions of the common components will be omitted.

Storage chamber 570 is a space that is formed by widening of first channel 520 (main channel 526) in a direction opposite to the widening direction of first chambers 530 with respect to main channel 526 interposed in between, and that has a size capable of accommodating a number of droplets to be separated. For example, storage chamber 570 may be a rectangular parallelepiped space whose depth from surface 512 is 30 μm or greater and 500 μm or less that is the same as main channel 526, whose width in the direction parallel to the flow direction of main channel 526 (width in the X-axis direction in FIG. 8B) is 1 mm or greater and 5 mm or less, whose length in the direction opposite to the widening direction of first chambers 530 with respect to main channel 526 (length in the Z-axis direction in FIG. 8B) is 200 μm or greater and 1 mm or less, and whose depth from surface 512 toward the surface on which the second cover part is disposed (length in the Y-axis direction in FIG. 8B) is 30 μm or greater and 500 μm or less.

Note that storage chamber 570 has a rectangular parallelepiped shape in the present embodiment, but may be a space having any shape such as a partial sphere, a polygonal column, or the like.

Storage chamber 570 is disposed between inlet 522 and one of the plurality of first chambers 530 which is disposed at a position closest to inlet 522. Thus, storage chamber 570 temporarily stores therein droplets introduced from inlet 522 before the droplets are captured in first chambers 530. Thus, storage chamber 570 can temporarily store a number of droplets to be separated by first chambers 530 and second chambers 540, and can then introduce the stored droplets into main channel 526 for separation by first chambers 530 and second chambers 540.

When a number of droplets greater than can be captured in first chambers 530 is introduced into main channel 526, a droplet that is not captured in first chambers 530 may remain in main channel 526. For this reason, in order to discharge the remaining droplet, it is necessary that a fluid containing no droplet should flow through main channel 526 before droplets are introduced into second channels 550. However, when the flow rate (flow pressure) of the fluid containing no droplet is high at this time, the droplet to be discharged is mixedly put into first chambers 530 which has already captured the droplets, so that a separation failure is likely to occur. Conversely, even in an attempt to discharge the remaining droplet over a long period of time with a reduced flow rate (flow pressure) of the fluid containing no droplet, there is a possibility that the droplets already captured in first chambers 530 leave first chambers 530 and are discharged at the same time as the remaining droplet.

In contrast, in the present embodiment, storage chamber 570 temporarily stores a number of droplets to be separated, and such a number of droplets to be separated are then introduced into main channel 526 and captured in first chambers 530. Hence, it is unnecessary to introduce a fluid containing no droplet for discharging the remaining droplet. It is thus possible to reduce the above-described separation failure and to perform separation of droplets in a shorter time.

(Operation Method of Fluid Handling Device)

Fluid handling device 500 is used, with first cover part 582 and the second cover part being joined respectively to the pair of surfaces of main-body part 510.

To begin with, fluid handling device 500 is installed at such an angle that storage chamber 570 is vertically above first channel 520, and a fluid containing a plurality of droplets is introduced from inlet 522 to first channel 520. The introduced fluid component flows through first channel 520 in the order of introduction channel 527, main channel 526, and discharge channel 528, and is discharged from outlet 524. When a droplet moving through main channel 526 reaches a portion where storage chamber 570 is formed, the droplet moves to storage chamber 570 by the buoyancy.

The flow rate of the introduced fluid during introduction of the fluid containing the droplets into first channel 520 may be any flow rate as long as enough pressure is exerted on the droplets such that the droplets can move vertically downward through introduction channel 527. For example, the flow rate of the fluid introduced at this time may be 60 μm/s or greater and 2000 μm/s or less.

After a sufficient number of droplets have moved into storage chamber 570, fluid handling device 500 is rotated to be installed at such an angle that first chambers 530, second chambers 540, and second channels 550 are vertically above first channel 520. In this state, a fluid containing no droplet is introduced into first channel 520 from inlet 522. The introduced fluid component exerts pressure on the droplets moved from storage chamber 570 to main channel 526 by the buoyancy as a result of the rotation of fluid handling device 500, so as to sequentially move the droplets through main channel 526 in a direction in which first chambers 530 are located. When the droplets moving through main channel 526 reach a portion where first chambers 530 are formed, the droplets move to first chambers 530 by the buoyancy, and are sequentially captured in first chambers 530 from first chamber 530 on the side of introduction channel 327 to first chamber 530 on the side of discharge channel 528.

Next, a fluid containing no droplet is introduced into first channel 520 from inlet 522. The introduced fluid component exerts pressure on droplets captured in first chambers 530 and moves the droplets to second chambers 540 through second channels 550. The droplets captured in respective first chambers 530 thus move to corresponding second chambers 540. The droplets individually captured in first chambers 530 can thus individually move to second chambers 540 without being mixed again. Note that, the fluid handling device may or may not be rotated at this time.

Lastly, fluid handling device 500 is disposed at such an angle that first cover part 582 or the second cover part is vertically above collection parts 560. The cover part which is arranged vertically above the collection parts is punctured at collection parts 560 to take out the droplets moved to respective collection parts 560 with a pipette or the like. Since each of collection parts 560 accommodates only one or a small number of droplets, the droplets can be easily individually collected.

(Effect)

With fluid handling device 500 according to the present embodiment, droplets can be easily separated.

In addition, only a number of droplets to be separated can be introduced into main channel 526 and captured in first chambers 530 according to fluid handling device 500 according to the present embodiment, so that it is unnecessary to discharge a droplet not captured in first chambers 530 and remaining in main channel 526. It is thus possible to reduce a separation failure caused due to introduction of a fluid containing no droplet into main channel 526 for discharging the remaining droplet. In addition, a process of discharging the remaining droplet is not required, and it is thus possible to separate droplets in a shorter time.

(Modification of Embodiment 5)

In the above description, an aspect has been described in which fluid handling device 100 according to Embodiment 1 includes storage chamber 570. However, fluid handling device 200 according to Embodiment 2 in which first valve 229 is disposed at a position on the downstream side of the connection positions at which first channel 220 is connected to first chambers 230, fluid handling device 200 according to the modification of Embodiment 2 in which second valve 229c is disposed at a position on the upstream side of the connection positions at which first channel 220 is connected to first chambers 230, fluid handling device 300 according to Embodiment 3 in which third valves 362 are disposed in second channels 350, and fluid handling device 400 according to Embodiment 4 in which third valves 462 are disposed in second channels 450 may also include the storage chamber. Note that, when the fluid handling device includes the second valve disposed at a position on the upstream side of the connection positions between the first channel and the first chambers as in the modification of Embodiment 2, it is desirable that the storage chamber be disposed at a position on the upstream side of the second valve.

In the case of each of these fluid handling devices, the fluid handling device can be installed at such an angle that the storage chamber is vertically above the first channel. A fluid containing a plurality of droplets can be introduced from the inlet to the first channel. After a sufficient number of droplets have moved into the storage chamber, the fluid handling device can be rotated to such an angle that the first chambers are vertically above the first channel. A fluid containing no droplet can be introduced into the first channel from the inlet to move those droplets which have moved by the buoyancy from the storage chamber to the main channel, so as to allow the droplets to be sequentially captured in the first chambers. Thereafter, the droplets captured in the first chambers can be moved to the second chambers and collected individually in the same manner as the operation of the fluid handling device according to each of the embodiments.

Further, an end portion of the storage chamber which is located on the inlet side and is in contact with the first channel may be beveled in the embodiments of the present invention and their modifications. Accordingly, the droplets introduced into the first channel are unlikely to be caught by the end portion where the first channel and the storage chamber are in contact with each other, so that the droplets easily move from the first channel to the storage chamber. Similarly, an end portion of the storage chamber which is located on the outlet side and is in contact with the first channel may also be beveled. The droplets moving from the storage chamber to the first channel are thus unlikely to be caught by the end portion where the storage chamber and the first channel are in contact with each other, so that the droplets easily move from the storage chamber to the first channel (main channel). Note that, when it is desired to suppress unintentional movement of the stored droplets to the first channel (main channel), it is unnecessary to bevel the end portion on the outlet side and in contact with the first channel.

Further, in the above description, the storage chamber is a chamber formed by widening of the main channel of the first channel. However, the storage chamber may also be a chamber formed by widening of the introduction channel or by widening of both of the introduction channel and the first channel.

Further, the storage chamber is formed by covering with the first cover part the recess formed in the surface of the main-body part in the above description. However, the storage chamber may be configured such that a part of the first cover part covering the first channel between the inlet and one of the plurality of first chambers disposed at a position closest to the inlet is bent in a direction away from the main-body part, thereby forming a space for storing droplets.

[Application]

Fluid handling devices 100, 200, 300, 400 and 500 may be used as a micro channel device.

[Fluid Handling System]

The fluid handling device according to each of the embodiments may be used in combination with a holding mechanism configured to hold the fluid handling device. That is, a fluid handling system includes a fluid handling device and a holding mechanism capable of holding the fluid handling device such that the first chambers widen vertically above the first channel. The fluid handling system may further include a rotating mechanism for rotating the fluid handling device. The rotating mechanism can switch between a state in which the fluid handling device is installed at such an angle that the first chambers are vertically above the first channel and a state in which the fluid handling device is installed at such an angle that the punctured first cover part or the punctured second cover part faces vertically upward. Further, the rotating mechanism can switch between a state in which the fluid handling device is installed at such an angle that the storage chamber is vertically above the first channel and a state in which the fluid handling device is installed at such an angle that the first chambers are vertically above the first channel.

Note that the fluid handling device according to the present invention is not limited to the above-described aspects. For example, the inner surface of the first channel or the second channel may be hydrophilized as necessary.

Additionally or alternatively, the fluid handling device may be configured not to include any collection part and may be configured to collect droplets from the second chambers.

In addition, the above embodiments can be used in combination with one another as necessary. For example, the third valves may be disposed in the second channels in Embodiment 2, or the first valve may be disposed in the first channel in Embodiment 4.

This application is entitled to and claims the benefit of Japanese Patent Application No. 2018-029005 filed on Feb. 21, 2018 and Japanese Patent Application No. 2018-106752 filed on Jun. 4, 2018, the disclosures of which including the specifications, drawings and abstracts are incorporated herein by reference in their entirety.

INDUSTRIAL APPLICABILITY

The fluid handling device of the present invention is useful for a fluid handling device used in medical fields and the like, for example.

REFERENCE SIGNS LIST

100, 200, 300, 400, 500 Fluid handling device
110, 210, 310, 410, 510 Main-body part
112, 212, 312, 412, 512 Surface
114 Surface
120, 220, 320, 420, 520 First channel
122, 222, 322, 422, 522 Inlet
124, 224,324, 424, 524 Outlet
126, 226, 326, 426, 526 Main channel 127, 227, 327, 427, 527 Introduction channel
128, 228, 328, 428, 528 Discharge channel
130, 230, 330, 430, 530 First chamber
140, 240, 340, 440, 540 Second chamber
150, 250, 350, 450, 550 Second channel
160, 260, 360, 460, 560 Collection part
165 Opening
182, 282, 382, 482, 582 First cover part
184 Second cover part
229 First valve
229a Diaphragm
229b Partition wall
229c Second valve
362, 462 Third valve
570 Storage chamber

What is claimed is:

1. A fluid handling device, comprising:
a first channel through which, when a fluid containing a droplet is caused to flow, the droplet is movable;
a first chamber formed by widening of the first channel, the first chamber being configured to capture the droplet moving through the first channel in a state where the first chamber is disposed to widen vertically above the first channel;
a second chamber to which the droplet captured in the first chamber is movable; and
a second channel that communicates between the first chamber and the second chamber, wherein
passage and restriction of passage of the droplet through the second channel are able to be selectively performed.

2. The fluid handling device according to claim 1, wherein
the second channel has a cross-sectional area in a section orthogonal to a flow direction of a fluid, the cross-sectional area being smaller than that of the first channel,
when the fluid containing the droplet is caused to flow through the first channel at a first flow rate, the first chamber captures the droplet moving through the first channel, and
the second channel allows the droplet captured in the first chamber to move to the second chamber when a fluid not containing the droplet is caused to flow through the first channel at a second flow rate that is greater than the first flow rate.

3. The fluid handling device according to claim 1, wherein
the first channel includes a first valve disposed on the downstream side of a connection position at which the first channel is connected to the first chamber,
the first valve is capable of switching between an open state in which a fluid flows from the upstream side to the downstream side of the first channel and a closed state in which a flow of the fluid from the upstream side to the downstream side of the first channel is blocked up,
when the first valve is opened and the fluid containing the droplet is caused to flow through the first channel, the first chamber captures the droplet moving through the first channel, and
the second channel allows the droplet captured in the first chamber to move to the second chamber when the first valve is closed and a fluid containing no droplet is caused to flow through the first channel in a direction that is the same as a fluid flow through the first channel during a time when the first chamber captures the droplet.

4. The fluid handling device according to claim 1, wherein
the first channel includes a second valve disposed on the upstream side of a connection position at which the first channel is connected to the first chamber,
the second valve is capable of switching between an open state in which a fluid flows from the upstream side to the downstream side of the first channel and a closed state in which a flow of the fluid from the upstream side to the downstream side of the first channel is blocked up,
when the second valve is opened and the fluid containing the droplet is caused to flow through the first channel, the first chamber captures the droplet moving through the first channel, and
the second channel allows the droplet captured in the first chamber to move to the second chamber when the second valve is closed and a fluid not containing the droplet is caused to flow through the first channel in a direction that is opposite to a direction of a fluid flow through the first channel during a time when the first chamber captures the droplet.

5. The fluid handling device according to claim 1, wherein
the second channel includes a third valve that is capable of switching between an open state in which a fluid flows from a side of the first chamber to a side of the second chamber and a closed state in which a flow of the fluid from the side of the first chamber to the side of the second chamber is blocked up.

6. The fluid handling device according to claim 1, wherein
the second channel includes a third valve that is capable of switching between an open state in which a fluid flows from a side of the first chamber to a side of the second chamber and a closed state in which a flow of the fluid from the side of the first chamber to the side of the second chamber is blocked up,
when the third valve is closed and the fluid containing the droplet is caused to flow through the first channel, the first chamber captures the droplet moving through the first channel, and
the second channel allows the droplet captured in the first chamber to move to the second chamber when the third valve is opened and a fluid not containing the droplet is caused to flow through the first channel.

7. The fluid handling device according to claim 1, wherein
the first chamber is a space sized to capture the droplet singly.

8. The fluid handling device according to claim 1, wherein
the second chamber communicates with an opening that opens to an outside,
and the opening is covered with a puncturable cover part.

9. The fluid handling device according to claim 1, further comprising:
a storage chamber disposed on the upstream side of a connection position at which the first channel is connected to the first chamber, the storage chamber being formed by widening of the first channel in a different direction than the first chamber.

10. A fluid handling system, comprising:
the fluid handling device according to claim 1; and
a holding mechanism capable of holding the fluid handling device such that the first chamber widens vertically above the first channel.

* * * * *